United States Patent [19]
Dumas

[11] 3,992,345
[45] Nov. 16, 1976

[54] WATER-DISPERSIBLE THERMOSETTABLE CATIONIC RESINS AND PAPER SIZED THEREWITH

[75] Inventor: David H. Dumas, Hockessin, Del.

[73] Assignee: Hercules Incorporated, Wilmington, Del.

[22] Filed: Sept. 8, 1975

[21] Appl. No.: 611,379

Related U.S. Application Data

[62] Division of Ser. No. 393,689, Aug. 31, 1973, Pat. No. 3,923,745.

[52] U.S. Cl. .................. 260/29.7 AT; 260/78.4 D; 526/23; 526/42; 260/29.2 TN; 260/29.2 R; 260/29.2 N; 260/77.5 CR; 162/168 N; 162/169

[51] Int. Cl.$^2$ .................. C08F 8/08; C08F 6/24; C08G 18/04; C08G 69/48

[58] Field of Search ................ 260/29.7 AT, 29.2 R, 260/29.2 N, 29.2 TN, 77.5 CR, 89.7 S, 78.4 D, 78.4 EP; 450/612, 622.5

[56] References Cited
UNITED STATES PATENTS 3,700,623 10/1972 Keim ............................. 260/80.3 R
3,923,745 12/1975 Dumas ......................... 260/77.5 CR

FOREIGN PATENTS OR APPLICATIONS 804,504 11/1958 United Kingdom ................ 162/158

OTHER PUBLICATIONS

MacDonald; R. G., ed. Papermaking & Paperboard Making, vol. III, 2nd Ed., McGraw-Hill, N.Y. (1970), p. 51.

*Primary Examiner*—William F. Hamrock
*Attorney, Agent, or Firm*—Charles L. Board

[57] ABSTRACT

Disclosed are novel water-insoluble, water-dispersible thermosettable cationic resins derived by reaction of a diallylamine polymer, a hydrophobizing compound such as a ketene dimer and an epihalohydrin such as epichlorohydrin. The thermosettable cationic resins are water-dispersible, and aqueous dispersions thereof are stable for prolonged periods of time at relatively high solids concentration. The thermosettable cationic resins have particular utility in the sizing of paper.

6 Claims, No Drawings

WATER-DISPERSIBLE THERMOSETTABLE CATIONIC RESINS AND PAPER SIZED THEREWITH

This is a division of application Ser. No. 393,689, filed Aug. 31, 1973, now U.S. Pat. No. 3,923,745.

This invention relates to novel water-insoluble, water-dispersible cationic thermosettable resins capable of imparting a high degree of sizing to paper and related cellulosic fibers.

More particularly, this invention relates to novel water-insoluble, water-dispersible cationic thermosettable resins derived by reacting a diallylamine polymer, a hydrophobizing compound such as a ketene dimer, and an epihalohydrin such as epichlorohydrin.

It is known that the hydrohalide salts of diallylamines can be polymerized using free radical catalysts to give polymer salts that are water-soluble and which yield on neutralization the free bases or free amine polymers.

It is also known that water-soluble, alkaline curing resins can be prepared by reacting epihalohydrin with these diallylamine polymers under alkaline conditions. These resins when used for the wet strengthening of paper are fast curing and do not require aging to obtain significant wet strength and additionally give superior dry strength to paper.

In accordance with this invention novel water-insoluble, water-dispersible cationic thermosettable resins which can be used in the sizing of paper under neutral conditions, under alkaline conditions and under acid conditions are prepared by reacting epihalohydrin, and particularly epichlorohydrin, with certain modified diallylamine polymers derived by reacting diallylamine polymers with specific hydrophobizing compounds.

Thus, the present invention relates to water-insoluble, water-dispersible cationic thermosettable resins that are derived by reacting (A) an epihalohydrin such as epichlorohydrin and (B) a water-insoluble modified diallylamine polymer.

Water-insoluble polymer (B) is derived by reacting (1) a hydrophobizing compound (to be detailed more fully hereinafter) and (2) a diallylamine polymer consisting essentially of units of the formula

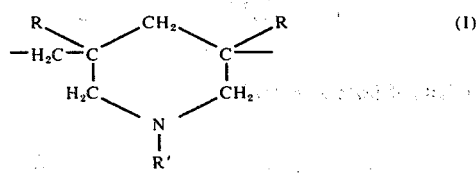 (I)

In formula (I), R is hydrogen or a $C_1$–$C_4$ alkyl and R' is hydrogen or methyl or ethyl. As to the units of the formula (I) of which the polymer essentially consists, in 100% to about 5% (preferably 100% to 10%) thereof R' will be hydrogen and in the remainder R' will be either methyl or ethyl. Thus, as to the amine functionality of the diallylamine polymers, from 100% to about 5% and preferably from 100% to about 10% thereof will be secondary amines,

and from about 95% to 0%, and preferably from about 90% to 0% thereof will be tertiary amines, either

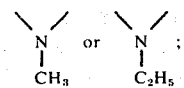

preferably

The amine functionality includes the amine salts as well as the free amine.

Diallylamine polymers consisting essentially of units of formula (I) can be derived by polymerizing from 5 mole percent to 100 mole percent of the hydrohalide salt of at least one diallylamine of the formula

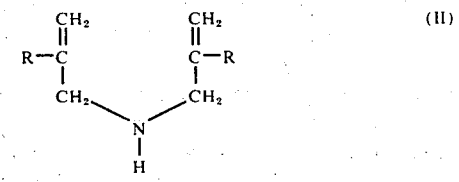 (II)

and from 95 mole percent to zero mole percent of the hydrohalide salt of at least one N-alkyl diallylamine of the formula

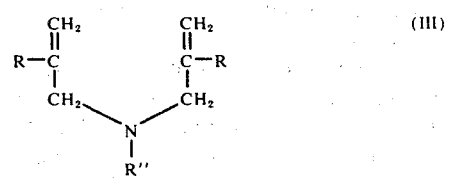 (III)

In (II) and (III), R is the same as in (I) and in (III), R'' is methyl or ethyl.

Examples of hydrohalide salts of diallylamines of formula (II) include
diallylamine hydrochloride
diallylamine hydrobromide
2,2'-dimethyl diallylamine hydrochloride
2,2'-dimethyl diallylamine hydrobromide
2,2'-diethyl diallylamine hydrochloride
2,2'-diisopropyl diallylamine hydrochloride
2,2'-dipropyl diallylamine hydrochloride, and
2,2'-diisobutyl diallylamine hydrochloride.

Examples of hydrohalide salts of N-alkyl diallylamines of formula (III) include
N-methyl diallylamine hydrochloride
N-methyl diallylamine hydrobromide
N-ethyl diallylamine hydrochloride
N-ethyl diallylamine hydrobromide
2,2'-dimethyl-N-methyl diallylamine hydrochloride 2,2'-dimethyl-N-methyl diallylamine hydrobromide
2,2'-diethyl-N-ethyl diallylamine hydrochloride
2,2'-diethyl-N-ethyl diallylamine hydrobromide
2,2'-dipropyl-N-methyl diallylamine hydrochloride.

Diallylamine polymers are known in the art as are methods for their preparation. See, for example, U.S. Pat. Nos. 2,926,161 and 3,700,623, reference to which is hereby made.

In preparing the novel resins of this invention, the diallylamine polymer is first reacted with a compound (to be detailed more fully hereinafter and to be referred to hereinafter as "hydrophobizing compound") that will produce a reaction product that is water-insoluble. The reaction product is sometimes referred to hereinafter as a water-insoluble modified diallylamine polymer or as a modified diallylamine polymer. The hydrophobizing compound is a compound that will react with the secondary amine groups of the polymer to form therewith a covalent bond. Examples of such compounds that will react with the secondary amines of the diallylamine polymer are acyl halides, acid anhydrides, organic isocyanates, and alkyl ketene dimers. These compounds will contain a total of from 12 to about 40 carbon atoms and preferably from about 16 to about 36 carbon atoms.

As previously set forth, the amine functionality of the diallylamine polymers will consist of 100% to 5% secondary amines and from 95% to 0% tertiary amines.

The amount of hydrophobizing compound reacted with the diallylamine polymer will be that sufficient to produce a modified diallylamine polymer that retains at least about 50% and preferably about 75% of its amine functionality, either the free amine, the amine salt, or both, for subsequent reaction with epihalohydrin. Thus, the modified diallylamine polymer, modified by reaction with a hydrophobizing compound, will be water-insoluble and will contain at least about 50% amine functionality, and preferably about 75% amine functionality.

The lower limit of hydrophobizing compound employed will be 0.05 mole percent of total amine functionality of the polymer and the upper limit will be 0.5 mole, preferably 0.25 mole, per mole of total amine functionality of the polymer. The precise amount of hydrophobizing compound reacted will be limited in some polymers by the mole percent of secondary amine in the polymer. This will be apparent to one skilled in the art.

Acyl halides that can be used have the formula $R_1COX$ where X is a halogen such as chlorine, bromine, iodine, and fluorine and $R_1$ is a saturated or unsaturated hydrocarbon radical. The hydrocarbon radical can be a straight or branched chain alkyl radical, an aromatic substituted alkyl radical, an aromatic radical, or an alkyl substituted aromatic radical and the hydrocarbon radical will contain a total of from 11 to about 39 carbon atoms and preferably from about 15 to about 35 carbon atoms. Specific examples of acyl halides include rosin acid chloride, myristoyl chloride, palmitoyl chloride, oleoyl chloride, and stearoyl chloride.

Acid anhydrides that can be employed include acid anhydrides having the structural formula

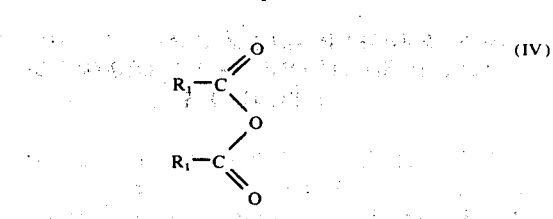

where $R_1$ is as defined above and cyclic dicarboxylic acid anhydrides having the structural formula

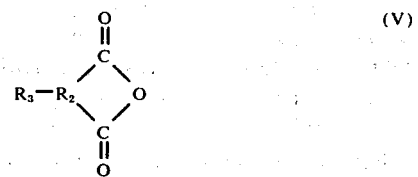

where $R_2$ represents a dimethylene or trimethylene radical and where $R_3$ is a hydrocarbon radical containing more than 7 carbon atoms and is selected from the group consisting of alkyl, alkenyl, aralkyl or aralkenyl.

Specific examples of anhydrides of formula (IV) are rosin anhydride, myristol anhydride, palmitoyl anhydride, oleoyl anhydride, and stearoyl anhydride.

Specific examples of anhydrides of formula (V) are isooctadecenyl succinic anhydride, n-hexadecenyl succinic anhydride, dodecyl succinic anhydride, decenyl succinic anhydride, octenyl succinic anhydride and heptyl glutaric anhydride.

Isocyanates that can be used have the formula $R_1-N=C=O$ where $R_1$ is as above defined. Specific examples of such isocyanates are rosin isocyanate, octadecyl isocyanate, dodecyl isocyanate, tetradecyl isocyanate, hexyldecyl isocyanate, eicosyl isocyanate and docosyl isocyanate.

The ketene dimers which are used in this invention are dimers having the formula $[R_4CH=C=O]_2$ where $R_4$ is a hydrocarbon radical, such as alkyl having at least 8 carbon atoms, cycloalkyl having at least 6 carbon atoms, aryl, aralkyl, and alkaryl. In naming ketene dimers, the radical "$R_4$" is named followed by "ketene dimer". Thus, phenyl ketene dimer is:

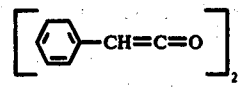

benzyl ketene dimer is:

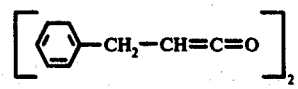

and decyl ketene dimer is: $[C_{10}H_{21}-CH=C=O]_2$. Examples of ketene dimers include octyl, decyl, dodecyl, tetradecyl, hexadecyl, octadecyl, eicosyl, docosyl, tetracosyl, phenyl, benzyl, β-naphthyl and cyclohexyl ketene dimers, as well as the ketene dimers prepared from montanic acid, naphthenic acid, Δ9,10-decylenic acid, Δ9,10-dodecylenic acid, palmitoleic acid, oleic acid, ricinoleic acid, petroselinic acid, vaccenic acid, linoleic acid, linolenic acid, eleostearic acid, licanic acid, parinaric acid, tariric acid, gadoleic acid, arachidonic acid, cetoleic acid, erucic acid and selacholeic acid, as well as ketene dimers prepared from naturally occurring mixtures of fatty acids, such as those mixtures found in coconut oil, babassu oil, palm kernel oil, palm oil, olive oil, peanut oil, rape oil, beef tallow, lard (leaf) and whale blubber. Mixtures of any of the above-named fatty acids with each other may also be used.

The reaction of diallylamine polymer and hydrophobizing compound is carried out under relatively mild conditions so that no untoward reaction occurs. Thus, the reaction conditions are such that the only reaction taking place is the reaction of the hydrophobizing compound with secondary amines of the diallylamine polymer whereby secondary amines are converted into amides, ureas, $\beta$-ketoamides or $\beta$-amido acids, depending on the hydrophobizing compound reactant. Thus, the diallylamine polymer and hydrophobizing compound are reacted under atmospheric or higher pressure, with or without a catalyst, under a nitrogen blanket at a reaction temperature of from about 0° C. to about 100° C. and a pH of about 6 to 8 to produce a resin that is essentially water-insoluble. Suitable catalysts, if one is employed, include tertiary amines such as triethylamine. The amount of catalyst employed will usually be, by weight, from about 0.1% to about 1% of the total weight of the reactants employed.

The thus modified diallylamine polymer is then reacted in aqueous medium or in a suitable solvent therefor at a solids content of from about 10% to about 40% with epihalohydrin at a pH of about 6 to about 8 and at a temperature of from about 20° C. to about 100° C. (preferably from about 50° C. to about 70° C.) for a period of time from about ½ hour to 3 hours (the time varying inversely with temperature). The epihalohydrin can be any epihalohydrin, i.e., epichlorohydrin, epibromohydrin, epifluorohydrin or epiiodohydrin and is preferably epichlorohydrin. The amount of epihalohydrin used in the reaction with the modified diallylamine polymer will be that amount which is sufficient to react with the remainder of the amine functionalities of the water-insoluble modified diallylamine polymer.

When water is employed as the reaction medium in carrying out the reaction of the modified diallylamine polymer with epichlorohydrin, the water-insoluble reaction product in its aqueous reaction medium can be homogenized to reduce the particle size of the solids. Subsequently, the pH of the resulting aqueous dispersion is adjusted to a pH of from about 5 to about 7 to provide for optimum stability of the dispersion. Stable dispersions having a solids content of from about 10% to about 22% can be made by this means.

The epihalohydrin reaction can be carried out in an organic solvent solution of the modified diallylamine polymer. Suitable solvents include methanol, ethanol, isopropanol, propanol, butanol and benzene. Mixtures of two or more solvents can be used if desired. It is to be understood that the solvent employed is non-reactive with the reactants or with the reaction product under reaction conditions.

Highly stable aqueous dispersions of the novel resinous reaction products of this invention that are prepared in solvent solution can be easily and readily prepared by the following procedure. In this instance, the solvent medium employed must be a solvent not only for the reactants but also for the reaction product.

Thus, the reaction product dissolved in the organic solvent reaction medium is dispersed in water with vigorous agitation such, for example, as by homogenization at pressures from about 1000 to 5000 p.s.i. to provide an aqueous emulsion. Subsequently, the organic solvent component of the resulting aqueous emulsion is removed by distillation, either under atmospheric conditions or under vacuum to provide a stable aqueous dispersion of the reaction product.

The aqueous dispersions of the water-insoluble cationic thermosettable resins of this invention are used in the manufacture of sized paper.

The resin is applied in its thermosettable state. It is subsequently cured, as by application of heat, to its thermoset or cross-linked state. Thus, paper, sized in accordance with this invention, will contain the resin in the thermoset state. Curing or cross-linking involves a time-temperature relationship, time varying inversely with temperature. Thus, for example, the resin can be cured to its thermoset state by heating paper containing the thermosettable resin at a temperature of from about 200° F. to 250° F. for a period of from about 60 seconds to about 10 seconds. In actual practice, the conventional drum drying of the treated paper sheet will provide for sufficient curing of the resin.

The following examples are illustrative of this invention. All percentages are by weight unless otherwise specified.

EXAMPLE 1

Part 1 A poly(diallylamine hydrochloride) is prepared as follows. Into a pop bottle equipped with a magnetic stirrer and containing 258 grams (1.94 moles) of diallylamine hydrochloride, is injected 468 grams of dimethyl sulfoxide to give a 35% solution. The bottle and contents are cooled in an ice bath, and 5.2 grams of ammonium persulfate as a 33% solution in dimethyl sulfoxide is introduced into the bottle. The bottle is evacuated and filled with nitrogen five times and then the bottle contents are allowed to warm to room temperature. The bottle is next immersed in a 30° C. bath and maintained therein for 96 hours, after which time the bottle is removed from the bath and vented. The contents are poured into a large volume of acetone, yielding a light tan, hygroscopic solid. The solid is separated from the acetone by filtration, washed with acetone, and dried overnight at 50° C. under vacuum. The product (88 grams) is water-soluble, has a reduced specific viscosity (RSV) of 0.21 as determined on a 0.1% solution in aqueous 1 molar sodium chloride at 25° C. and contains by analysis 9.2% nitrogen and 22.3% chloride ions.

Part 2 A poly(diallylamine)-ketone dimer-epichlorohydrin resin is prepared as follows: A 1-liter, 3-necked flask equipped with a magnetic stirrer, nitrogen inlet condenser, thermometer and pH electrodes is charged with 75.0 grams (0.55 mole) of the poly(diallylamine hydrochloride) prepared above in Part 1 and 595 grams of methanol, giving a deep red colored solution having a pH of 1.6. 2 molar methanolic sodium hydroxide is added to the solution to adjust the pH to 7.2 and a solution of 36.1 grams (0.072 mole) of a mixed hexadecyl-tetradecyl ketene dimer from a mixture of stearic and palmitic acids in 30 grams of benzene is added dropwise to the solution at room temperature. The reaction mixture becomes heterogeneous and additional methanolic sodium hydroxide is added to adjust the pH to 6.9. Next, 67 grams (0.72 mole)

epichlorohydrin is added rapidly and the reaction mixture is heated to reflux over a 20 minute period, during which time the reaction mixture becomes homogeneous. The homogeneous solution is blended into 1100 grams of distilled water in an air driven blender for 3 minutes and the blended dispersion is homogenized at 4500 p.s.i. in a Manton-Gaulin laboratory homogenizer. The dispersion has a pH of 7.6. The solvent is removed on a rotary evaporator while maintaining the bath temperature below 60° C. The resulting product is a yellowish-brown viscous dispersion having a solids content of about 8.0% and a pH of 7.0.

Part 3 The aqueous dispersion prepared in Part 2 of this example is applied as a size to a waterleaf paper sheet (a 50:50 blend of hardwood and softwood pulps) on a size press by passing the sheet through a solution thereof in the nip. The amount of size material applied is about 0.21% by weight based on the weight of the paper. The sized paper sheet is subsequently drum dried at 210°–220° F. for 33–35 seconds. Sizing results set forth herein are determined on the Hercules Sizing Tester. The sizing test determines the resistance of a sized sheet of paper to penetration by No. 2 Test Solution (an aqueous solution of, by weight, 1.0% formic acid and 1.25% Naphthol Green B). The time necessary for ink penetration to reduce light reflectance to 80% of the sheet's initial value is used to represent the degree of sizing. The degree of sizing in this example is 630 seconds.

EXAMPLE 2

The general procedure of Example 1 is repeated except that in this example the polymer which is reacted with the ketene dimer and epichlorohydrin is a copolymer of 90 mole percent N-methyl diallylamine and 10 mole percent diallylamine.

Part 1 A copolymer of N-methyl diallylamine and diallylamine is prepared according to the procedure of Example 1, Part 1, except that a mixture of 200 grams of N-methyl diallylamine hydrochloride and 50 grams of diallylamine hydrochloride is substituted for the 258 grams of diallylamine hydrochloride and 455 grams of dimethyl sulfoxide and 5 grams of ammonium persulfate are used. The copolymer (75 grams) is water-soluble, has an RSV of 0.2 and contains by NMR analysis 90 weight percent of N-methyl diallylamine hydrochloride.

Part 2 A resin is prepared from the copolymer of N-methyl diallylamine and diallylamine, a ketene dimer and epichlorohydrin as follows: A 1-liter, 3-necked flask equipped with a magnetic stirrer, nitrogen inlet condenser, thermometer and pH electrodes is charged with 74.1 grams (0.51 mole) of the copolymer prepared above in Part 1 and 595 grams of methanol. 2 Molar methanolic sodium hydroxide is added to the solution to raise the pH to 6.6 and a solution of 26.5 grams (0.052 mole) of a mixed hexadecyl-tetradecyl ketene dimer from a mixture of stearic and palmitic acids in 22 grams of benzene is added dropwise to the solution at 30° C. The reaction mixture becomes heterogeneous and additional methanolic sodium hydroxide is added to adjust the pH to 6.5. Next, 55.3 grams (0.6 mole) of epichlorohydrin is added and the reaction mixture is heated to reflux in 15 minutes, after which time the mixture is poured into 1200 grams of distilled water in a blender. The intractable gel which forms is broken by the addition of concentrated hydrochloric acid to give a pH of about 2.0 and the mixture is homogenized manually. The solvent is removed on a rotary evaporator while maintaining the bath temperature below 60° C. The product is a clear, viscous dispersion having a solids content of 6.5% and a pH of 6.5.

Part 3 The aqueous dispersion prepared above in Part 2 of this example is evaluated as a size according to the procedure of Example 1, Part 3. The degree of sizing in this example is 535 seconds.

It is to be understood that the above specification and working examples are illustrative of this invention and not in limitation thereof.

What I claim and desire to protect by Letters Patent is:

1. An aqueous dispersion of a water-insoluble, water-dispersible thermosettable cationic resin derived by reacting (I) an epihalohydrin and (II) a water-insoluble modified diallylamine polymer derived by reaction of (a) a diallylamine polymer consisting essentially of units of the formula

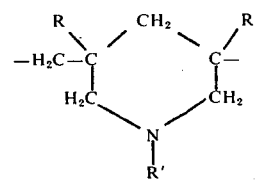

where R is hydrogen or a $C_1$–$C_4$ alkyl and R' is hydrogen, methyl, or ethyl and of the number of R's present in the polymer from 100% to 5% thereof are hydrogen and from 95% to 0% thereof are methyl or ethyl, and (b) a hydrophobizing compound selected from the group consisting of acyl halides, acid anhydrides, ketene dimers, and organic isocyanates, said hydrophobizing compound having a total of from about 12 to about 40 carbon atoms, the said modified diallylamine polymer having at least about 50% amine functionality, said reaction of (a) and (b) being carried out under a nitrogen blanket at a reaction temperature of from about 0° C. to about 100° C. and a pH of about 6 to 8, the amount of epihalohydrin employed being that amount sufficient to react with substantially all the amine functionalities of the water-insoluble modified diallylamine polymer.

2. An aqueous dispersion of a water-insoluble, water-dispersible thermosettable cationic resin derived by reacting (I) epichlorohydrin and (II) a water-insoluble modified diallylamine polymer derived by reaction of (a) a diallylamine polymer consisting essentially of units of the formula

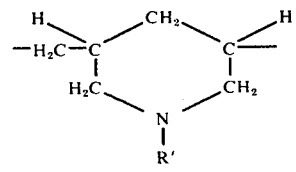

where R' is hydrogen, methyl, or ethyl and of the number of R's present in the polymer from 100% to 10% thereof are hydrogen and from 90% to 0% thereof are methyl or ethyl, and (b) a hydrophobizing compound selected from the group consisting of acyl halides, acid anhydrides, ketene dimers, and organic isocyanates, said hydrophobizing compound having a total of from about 16 to about 36 carbon atoms, the said modified diallylamine polymer having at least about 75% amine functionality, said reaction of (a) and (b) being carried out under a nitrogen blanket at a reaction temperature of from about 0° C. to about 100° C. and a pH of about 6 to 8, the amount of epichlorohydrin employed being that amount sufficient to react with substantially all the amine functionality of the water-insoluble modified diallylamine polymer.

3. The aqueous dispersion of claim 2 wherein the hydrophobizing compound used to prepare the dispersed resin is a ketene dimer.

4. The aqueous dispersion of claim 2 wherein the hydrophobizing compound used to prepare the dispersed resin is an acyl halide.

5. The aqueous dispersion of claim 2 wherein the hydrophobizing compound used to prepare the dispersed resin is an acid anhydride.

6. The aqueous dispersion of claim 2 wherein the hydrophobizing compound used to prepare the dispersed resin is an organic isocyanate.

* * * * *